(12) United States Patent
Mickley

(10) Patent No.: US 12,099,796 B2
(45) Date of Patent: Sep. 24, 2024

(54) APPARATUS AND METHOD FOR GENERATING LICENSED FANCIFUL FONTS FOR MESSAGING SERVICES

(71) Applicant: Beth Mickley, Scottsdale, AZ (US)

(72) Inventor: Beth Mickley, Scottsdale, AZ (US)

( * ) Notice: Subject to any disclaimer, the term of this patent is extended or adjusted under 35 U.S.C. 154(b) by 127 days.

(21) Appl. No.: 17/448,753

(22) Filed: Sep. 24, 2021

(65) Prior Publication Data

US 2022/0012407 A1    Jan. 13, 2022

Related U.S. Application Data

(63) Continuation-in-part of application No. 16/694,416, filed on Nov. 25, 2019, now abandoned, which is a continuation-in-part of application No. 15/372,658, filed on Dec. 8, 2016, now abandoned.

(60) Provisional application No. 62/264,546, filed on Dec. 8, 2015.

(51) Int. Cl.
| | |
|---|---|
| *G06F 40/109* | (2020.01) |
| *G06F 3/04842* | (2022.01) |
| *G06F 3/04886* | (2022.01) |
| *H04W 4/14* | (2009.01) |

(52) U.S. Cl.
CPC ........ *G06F 40/109* (2020.01); *G06F 3/04842* (2013.01); *G06F 3/04886* (2013.01); *H04W 4/14* (2013.01)

(58) Field of Classification Search
CPC .... G06F 40/109; G06F 40/126; G06F 40/166; G06F 3/04842; G06F 3/04886; H04W 4/14
See application file for complete search history.

(56) References Cited

U.S. PATENT DOCUMENTS

| | | | |
|---|---|---|---|
| 6,504,545 B1 * | 1/2003 | Browne | G06T 13/00 345/473 |
| 6,678,410 B1 * | 1/2004 | Phinney | G06K 15/02 382/187 |
| 2010/0231598 A1 * | 9/2010 | Hernandez | G06F 40/109 345/471 |

(Continued)

OTHER PUBLICATIONS

Bhakthakumaran, "The Dr. Suess Alphabet is a Cartoon Depiction of the English Language", published May 2012, 2 pages (Year: 2012).*

(Continued)

*Primary Examiner* — Wilson W Tsui

(57) ABSTRACT

A method for generating themed branded fanciful fonts in text messages created with the communication device includes the steps of: licensing a brand from a university brand owner, the brand including a specified font set for text characters and brand design features identifying the brand; creating a branded fanciful font set having a plurality of fanciful text characters by combining the brand design features with more than one of the text characters of the specified font set; creating a plurality of themed branded fanciful font sets using the branded fanciful font set; and creating a font application that when executed by a communication device enables a user of the communication device to select one of the plurality of themed branded fanciful font sets to compose a text message with the communication device. The brand design features can include a mascot, school colors and a school nickname symbol.

8 Claims, 22 Drawing Sheets

(56) References Cited

U.S. PATENT DOCUMENTS

| | | | | |
|---|---|---|---|---|
| 2013/0027406 | A1* | 1/2013 | Liu | G06F 40/109 |
| | | | | 382/218 |
| 2013/0120396 | A1* | 5/2013 | Kaplan | G06T 11/203 |
| | | | | 715/273 |
| 2014/0136957 | A1* | 5/2014 | Kaasila | G06F 40/109 |
| | | | | 715/235 |
| 2015/0149895 | A1* | 5/2015 | Furman | G06F 40/109 |
| | | | | 715/269 |
| 2016/0004672 | A1* | 1/2016 | Sakunkoo | H04L 51/08 |
| | | | | 715/269 |
| 2016/0092937 | A1* | 3/2016 | Martin | G06Q 30/0267 |
| | | | | 705/14.43 |

OTHER PUBLICATIONS

UMaryland, "Logo and Brand Standards", published: Nov. 3, 2018, pp. 1-8 (Year: 2018).*
Adobe, Title: "Glyphs and Special Characters", published: Sep. 2017, publisher: adobe.com, pp. 1-10 (Year: 2017).*
WikiCommons1, "American Football", published: Oct. 2010, p. 1 (Year: 2010).*

* cited by examiner

Fig. 9

APPARATUS AND METHOD FOR GENERATING LICENSED FANCIFUL FONTS FOR MESSAGING SERVICES

CROSS-REFERENCE TO RELATED APPLICATIONS

This application is a continuation-in-part of the co-pending U.S. patent application Ser. No. 16/694,416, filed Nov. 25, 2019, that is a continuation-in-part of abandoned U.S. patent application Ser. No. 15/372,658, filed Dec. 8, 2016, that claims the benefit of U.S. provisional patent application Ser. No. 62/264,546, filed Dec. 8, 2015.

FIELD OF THE INVENTION

This invention relates to text (SMS), broadcast, social, and other related communication messaging platform services and an apparatus and method for generating fanciful, pictorial, and non-monochromatic fonts for forming text and shared messages.

BACKGROUND OF THE INVENTION

This section provides background information related to the present disclosure which is not necessarily prior art.

It is known to modify text to express emotion, including changing fonts, color, and size. Examples are a pop-up emoticon input selection (See US 2013/0002683 A1) and a text message alteration (See US 2011/0294525 A1). Several methods add a background image to express emotion (see hearts from US 2005/0156947 A1 and fireworks from US 2011/0055675 A1).

Text modification and color are used to indicate emotion as shown in US 2013/0151257 A1. Fanciful fonts, such as the animal fonts are shown in US Des. 394,278. One method converts a formatted text message into an image and sends the image to preserve the format (US 2012/0231774 A1 Diagram 4).

Published patent applications and issued patents describing other approaches to solving the problem of showing emotion in text message communication and in determining the mood or attitude of the person sending the message are: US 2014/0052792 A1; US 2013/0339983 A1; US 2013/0120429 A1; US 2010/0177048 A1; U.S. Pat. No. 8,166,418 B2; US 2005/0143108 A1; and U.S. Pat. No. 6,629,793 B1.

SUMMARY OF THE INVENTION

In one embodiment, the invention can be implemented as a software application (hereinafter "App") executed by a processor to cause an associated communications device to send a series of pictures using a text message format (SMS, MMS), broadcast, social, and other related communication messaging platform services. The App also can create one image using a fanciful font (Which is a series of multiple images in the shape of letters) and then send the image as a text message. The App can also have a feature where some or all of the images are only viewable for a limited amount of time. The App can also have a feature that requires a password to read the text. Further, the app may include a feature where a user obtains points and rewards based on usage of the App, wherein points acquired are directly related a quantity of messages sent or received by the user through the App.

When creating a text message, the App can generate a custom keyboard on the device display showing the images of the fonts (usually on a touch screen), and then inserts the images into the text message when a key is pressed. Specifically, the standard touchscreen keyboard is replaced with the custom keyboard and a preview window on the same screen. The images (most of which represent letters) are combined in the preview window, and when the user is finished editing and combining images, the message is saved as one image and can be sent or shared through a messaging service. In an alternate embodiment, the App generates an "Emotifont" softkey on the device display that, when selected, causes the images of the fanciful fonts to be displayed for selection. When a one of the fanciful fonts is selected the display shows a standard keyboard and a preview screen. As the standard keyboard is used to compose the message, the message is displayed in the preview screen using the selected fanciful font.

The App enables fanciful fonts to be used to send text messages, such as a font formed with hearts. The App works to combine fanciful fonts in other messaging applications without leaving the application, but just by opening the custom keyboard from the messaging application.

The invention is a software application that requires a computer (such as a hand held mobile device) and a communication system. The custom keyboard is typically a touchscreen keyboard and is used with a touchscreen device.

The App is a replacement for or addition to emoticons which are used in some text messaging systems to display emotion or feelings. Rather than (or in addition to) adding images that display emotions, the images of the text itself can be used to display emotion. For example, a font for love can include hearts for the dot on the letter "i" and the period.

The invention is a method for generating fanciful fonts in text messages created with a communication device comprising the steps of: operating the communication device to cause a processor in the communication device to open and execute a texting application stored in a memory; operating the communication device to cause the processor to open and execute a font application stored in the memory; operating the communication device to select one of a plurality of fanciful font sets available in the font application; composing a text message by inputting text characters using a keyboard displayed by the communication device in a display, the processor responding to the text characters by creating the text message incorporating the selected fanciful font set in accordance with the texting application and the font application; and displaying the text message incorporating the fanciful font set in the display.

The method includes operating the communication device to send the text message incorporating the fanciful from an input/output port of the communication device. The method includes displaying the keyboard as a standard keyboard or as a custom keyboard associated with the selected fanciful font set. The method includes wherein communication device displays in the display samples of at least two of the fanciful font sets of the plurality of fanciful font sets and a softkey for selecting among the samples being displayed.

An embodiment of the invention is a method for generating branded fanciful fonts in text messages created with a communication device, the method comprising the steps of: licensing from a brand owner a brand including a specified font set for text characters and brand design features identifying the brand, wherein the brand design features are not the text characters; wherein the brand owner is a university and the brand design features include two school colors, a nickname symbol and a mascot; creating a branded fanciful font set having a plurality of fanciful text characters by combining the brand design features with more than one of the text characters of the specified font set; wherein a first fanciful text character of the plurality of fanciful text characters combines the mascot with a portion of a first text character of the specified font set; wherein a second fanciful text character of the plurality of fanciful text characters combines at least one of the school colors with a second text character of the specified font set; wherein a third fanciful text character of the plurality of fanciful text characters combines the nickname symbol with a portion of a third text character of the specified font set; creating at least two themed branded fanciful font sets including the second fanciful text character, wherein the first fanciful text character is included only in a first of the at least two themed branded fanciful font sets and the third fanciful text character is included only in a second of the at least two themed fanciful font sets; and creating a font application that when executed by the communication device enables a user of the communication device to select one of the at least two themed branded fanciful font sets whereby when the user composes a text message with the communication device by inputting text using a keyboard displayed by the communication device in a display, the font application responds to the inputted text by creating the text message incorporating the selected themed branded fanciful font set and the communication device displays the text message incorporating the selected themed branded fanciful font set in the display.

Another embodiment of the invention is a method for generating branded fanciful fonts in text messages created with a communication device, the method comprising the steps of: licensing from a university brand owner a brand including a specified font set for text characters and brand design features identifying the brand, wherein the brand design features include two school colors, a nickname symbol and a mascot; creating a branded fanciful font set having a plurality of fanciful text characters by combining the brand design features with more than one of the text characters of the specified font set; wherein a first fanciful text character of the plurality of fanciful text characters combines the mascot with a portion of a first text character of the specified font set; wherein a second fanciful text character of the plurality of fanciful text characters combines at least one of the school colors with a second text character of the specified font set; wherein a third fanciful text character of the plurality of fanciful text characters combines the nickname symbol with a portion of a third text character of the specified font set; creating a plurality of themed branded fanciful font sets including the second fanciful text character, wherein the first fanciful text character is included only in a first of the plurality of themed branded fanciful font sets and the third fanciful text character is included only in a second of the plurality of themed fanciful font sets; and creating a font application that when executed by the communication device enables a user of the communication device to select one of the plurality of themed branded fanciful font sets whereby when the user composes a text message with the communication device by inputting text using a keyboard displayed by the communication device in a display, the font application responds to the inputted text by creating the text message incorporating the selected themed branded fanciful font set and the communication device displays the text message incorporating the selected themed branded fanciful font set in the display.

The method further includes displaying the text characters being input from the keyboard in a preview screen portion of the display. The method also includes operating the communication device to create a personal fanciful font set including at least a first text character from one of the fanciful fonts sets from the stored font application and including at least a second text character from another of the fanciful font sets from the stored font application and adding the personal font set to the font application.

The invention is a non-transitory computer-readable medium for generating fanciful fonts in text messages comprising instructions stored thereon that, when executed on a processor, perform the method steps recited above.

The invention is a communication device for generating fanciful fonts in text messages comprising: a processor connected to a memory and a display; a texting application stored in the memory and executed by the processor to generate in the display a keyboard used to compose text messages; and a font application stored in the memory and executed by the processor to permit a user to select one of a plurality of fanciful font sets, whereby when the user inputs text characters by the keyboard to compose a text message, the processor executes the texting application and the font application to create the text message incorporating the selected fanciful font and displays the text message incorporating the fanciful font in the display.

The communication device includes an input/output port connected to the processer for sending the text message from the input/output port in response to operation of the communication device by the user. The keyboard can be a standard keyboard, or a custom keyboard associated with the selected fanciful font set. The communication device displays in the display samples of at least two of the fanciful font sets of the plurality of fanciful font sets and a softkey for selecting among the samples being displayed. The display has a preview screen portion for displaying the text characters being input from the keyboard.

In another embodiment, the invention is a communication App that provides users of a device an ability to view, store, and use at least one fanciful font. The App further provides an interactive marketplace, wherein additional content for the App, such as branded fanciful fonts, may be purchased by the user for use in the App. The App may further include a store feature, wherein the user can personalize and purchase merchandise having a message created by the user using the App applied thereto.

DESCRIPTION OF THE DRAWINGS

The above as well as other advantages of the present invention will become readily apparent to those skilled in the art from the following detailed description of a preferred embodiment when considered in the light of the accompanying drawings in which:

FIGS. 7-21 are screen shots showing various fanciful fonts available for selection according to the invention.

DESCRIPTION OF THE PREFERRED EMBODIMENT

The U.S. provisional patent application Ser. No. 62/264,546 filed Dec. 8, 2015 is incorporated herein by reference.

The following detailed description and appended drawings describe and illustrate various exemplary embodiments of the invention. The description and drawings serve to enable one skilled in the art to make and use the invention and are not intended to limit the scope of the invention in any manner. In respect of the methods disclosed, the steps presented are exemplary in nature, and thus, the order of the steps is not necessary or critical.

Figure 1:
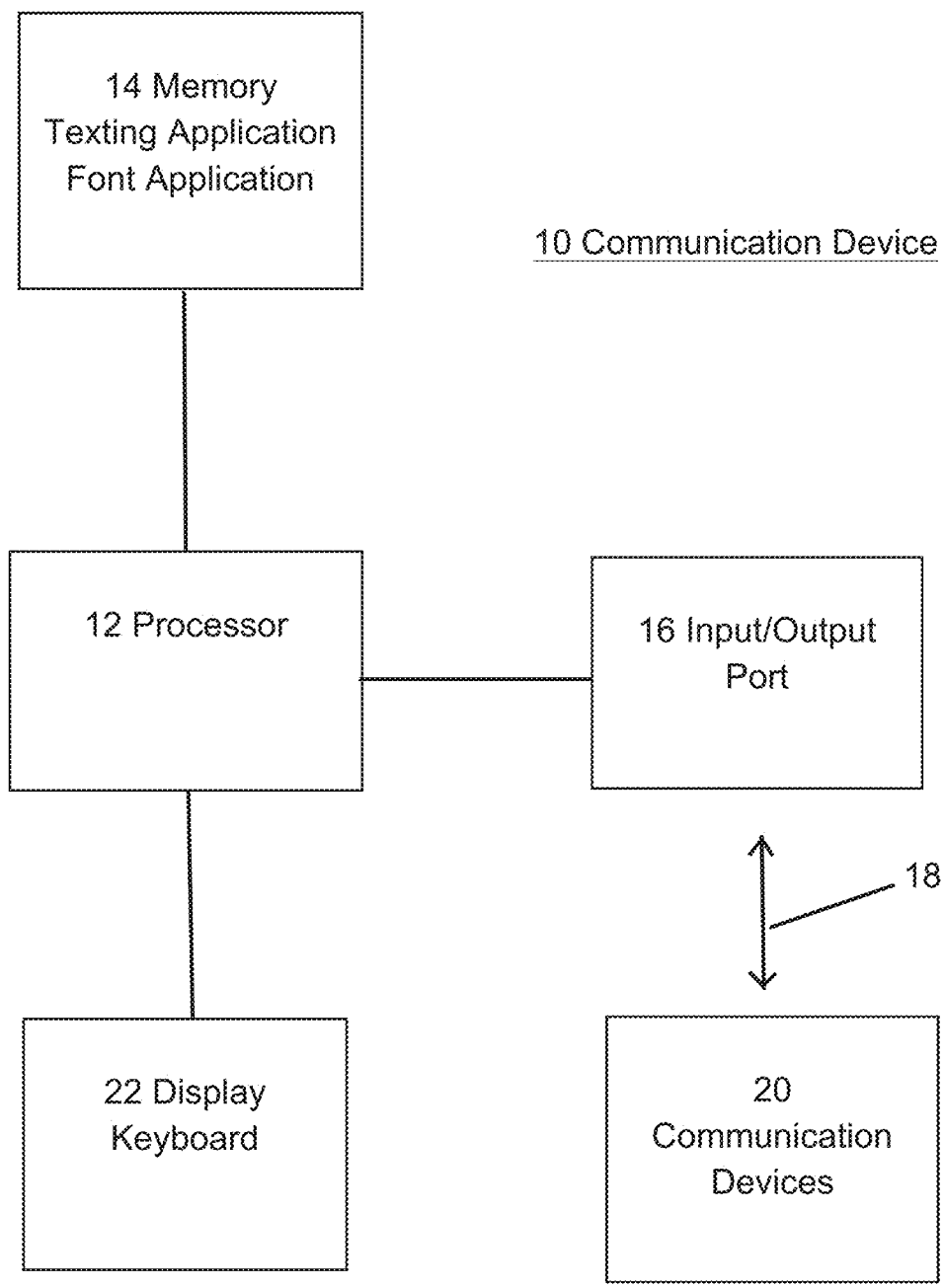
FIG. 1 is a block diagram of an apparatus according to the invention.

There is shown in FIG. 1 a typical communication device 10 according to the invention. The device 10 can be any device capable of sending and receiving text messages such as a smart phone or a tablet. The device 10 includes a processor 12 connected to a memory 14 that stores an operating program to control the functions of the device. The memory 14 also stores a texting application set of instructions that, when executed by the processor 12, generates text messages and receives text messages. The processor 12 is connected to an input/output port 16 for communication via a wireless network 18 with other communication devices 20 by which the text messages are exchanged.

The processor 12 is also connected with a display 22 for generating a visual representation of the text messages being generated, sent and received. The device operating program generates a visual representation of a keyboard on the display 22. The keyboard is an arrangement of touch sensitive keys on the screen of the display 22 by which a user can input a text message and control functions of the device 10. Also stored in the memory 14 is the font application (App) according to the invention. When the App is being executed by the processor 12, a custom keyboard is generated on the display 22 for creating text messages. The App may include a plurality of sets of fanciful fonts, each set having an associated custom keyboard that is displayed and activated when the font set is selected.

Figure 2:
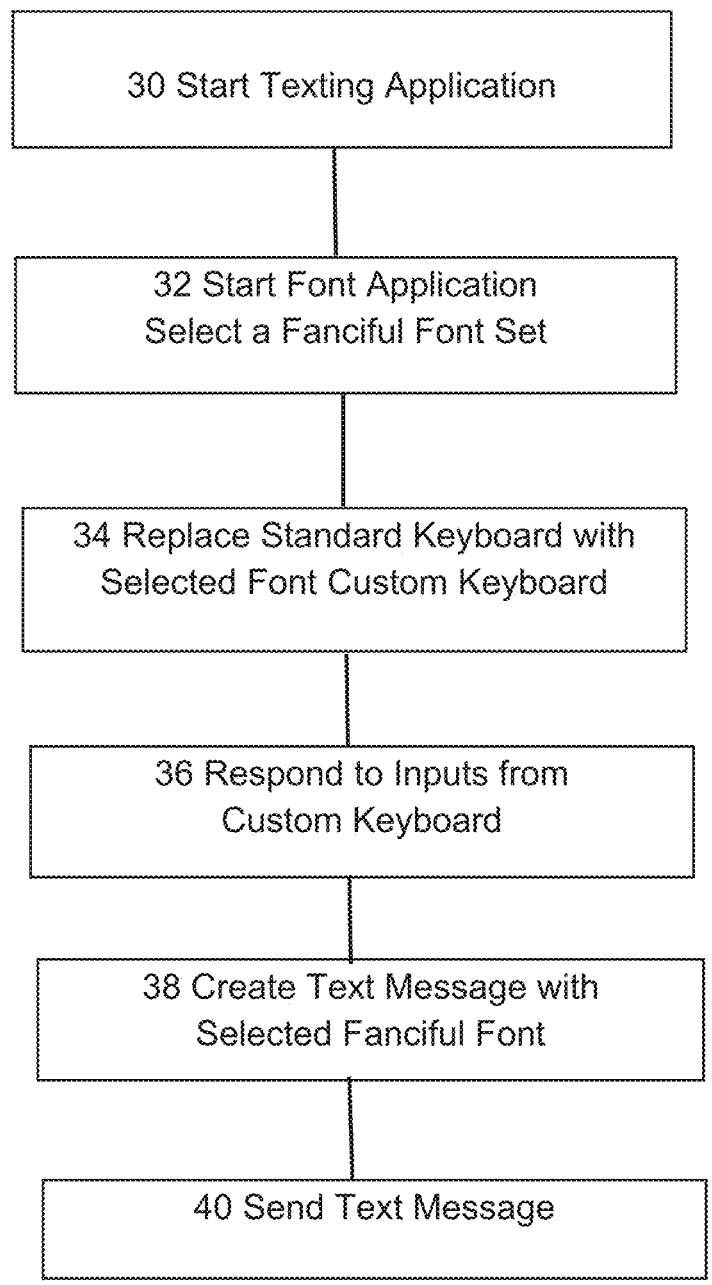
FIG. 2 is a flow diagram of the method according to the invention.

FIG. 2 is a flow diagram of the method according to the invention. In a step 30, the user operates the communication device 10 to cause the processor 12 to open the texting application loaded from the memory 14. In a step 32, the user then operates the device 10 to cause the processor 12 to open the font application (App) loaded from the memory 14. Then, the user can select one of the fanciful font sets available from the App using a menu generated by the App on the display 22. In a step 34, the App automatically replaces the standard keyboard in the display with the custom keyboard associated with the selected fanciful font set. In a step 36, the user inputs the letters and punctuation marks to compose a text message. In a step 38, the processor 12 executes the texting application and the App to create the text message incorporating the selected fanciful font. The message incorporating the fanciful font is displayed in a preview window on the display 22. The user can then operate the device 10 to send the text message from the input/output port 16 in a step 40.

The fanciful fonts can have any form capable of being generated on the display 22. As mentioned above, a font representing the love emotion can include hearts for the dot on the letter "i" and the period. Another font might use the "x" symbol for a kiss and the "o" symbol for a hug.

In an alternate embodiment, the App uses the standard keyboard. Thus, in the method shown in FIG. 2, the step 34 is eliminated and in the step 36 the user inputs the letters and punctuation marks on the standard keyboard to compose a text message. The steps 38 and 40 remain the same.

FIGS. 3-6 are screen shots of the display 22 produced by the communication device 10 running the alternate embodiment App. The display 22 includes a standard keyboard 50 that can be in a lower portion, a preview screen 52 that can be in a central portion, and an "Emotifont" softkey 54 that can be located to the left of an upper portion.

Figure 7:
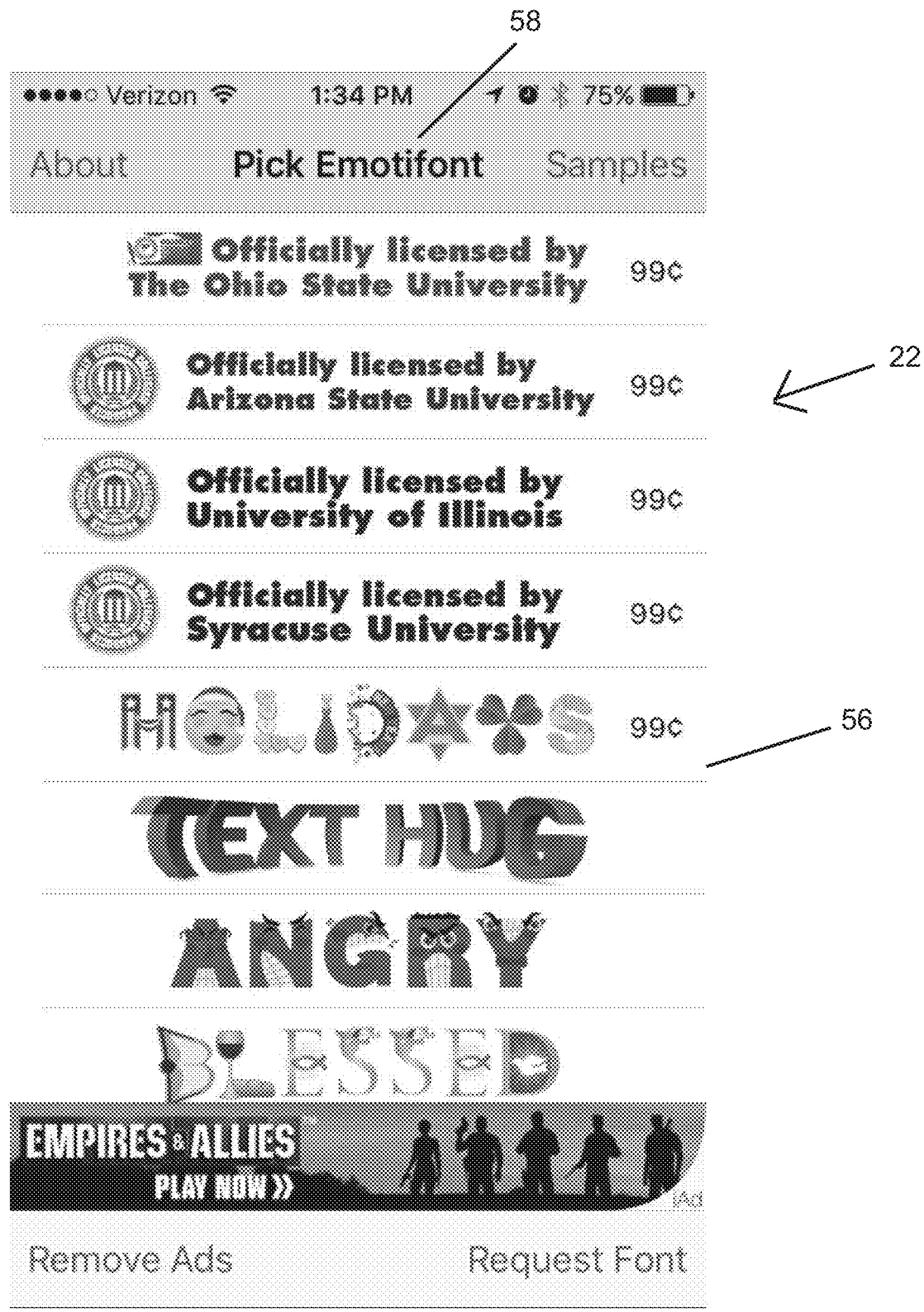
Figure 8:
Figure 10:
Figure 11:
Figure 12:
Figure 13:
Figure 14:
Figure 15:
Figure 16:
Figure 17:
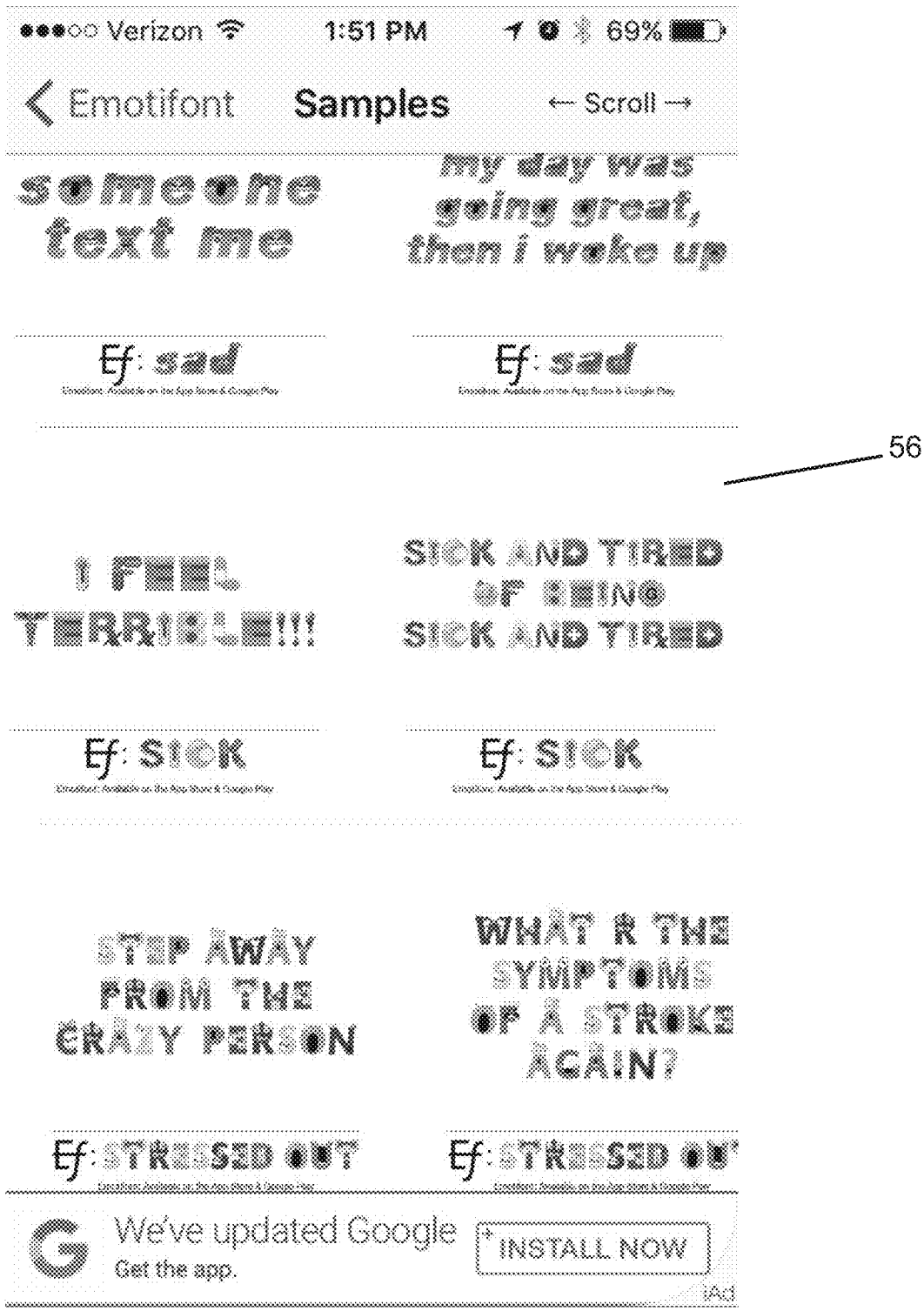
Figure 18:
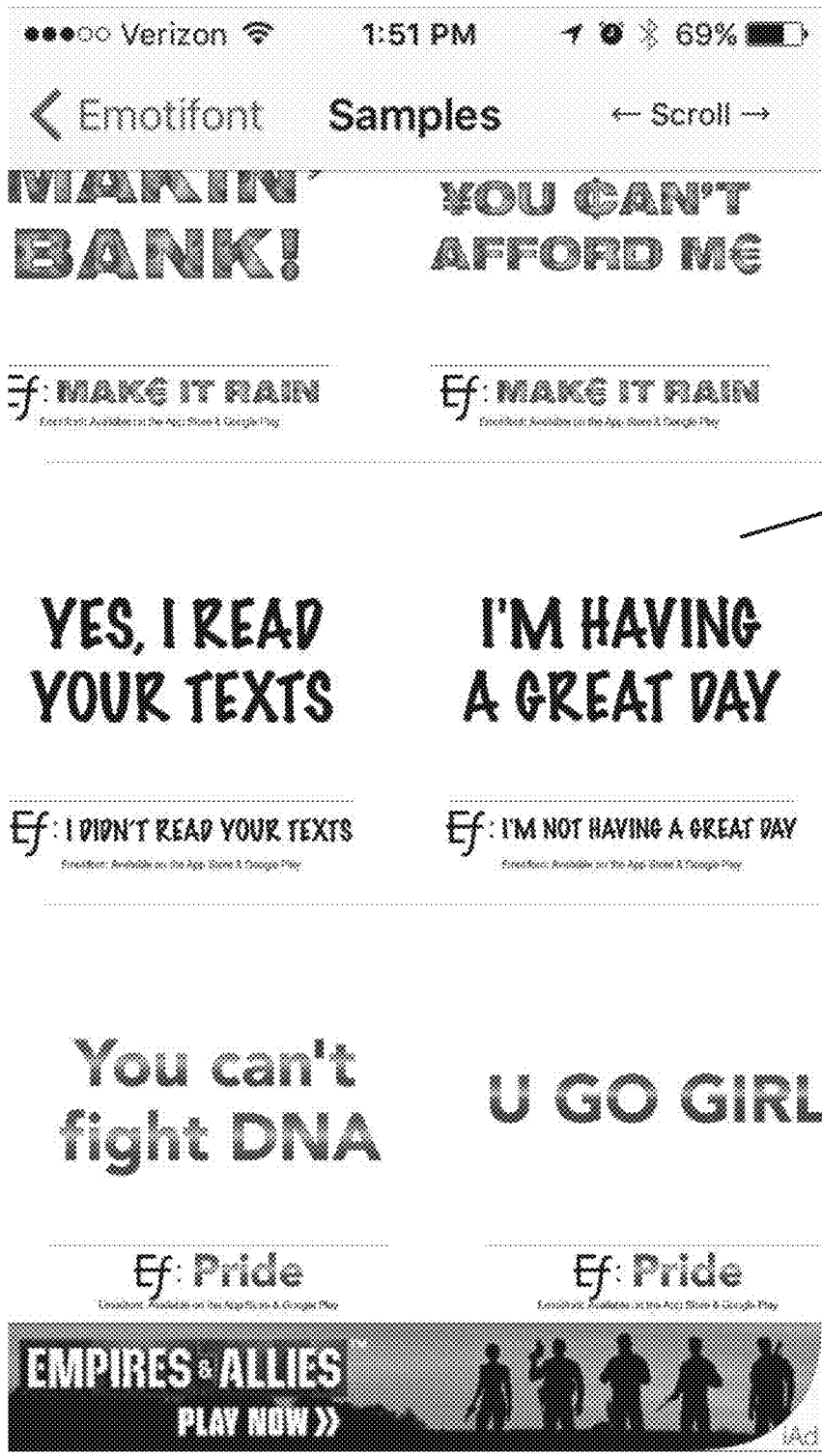
Figure 19:
Figure 20:
Figure 20:
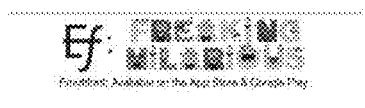
Figure 20:
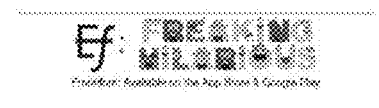
Figure 20:
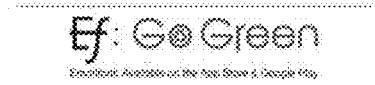
Figure 20:
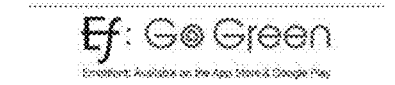
Figure 20:
Figure 21:

When the user opens the App (step 32) a list of fanciful fonts appears on the display 22 including universities, emotions, etc. A portion of the list 56 is shown in FIGS. 7-21. The user scrolls through the list to the fanciful font that the user desires and selects that font with a "Pick Emotifont" softkey 58 in the center of the upper portion of the display as shown in FIGS. 7-9. The user also can pick from a plurality of "Samples" shown in FIGS. 10-21 that automatically insert images and phrases.

Figure 3:
FIGS. 3-6 are screen shots showing the "Emotifont" softkey, the message preview screen and the standard keyboard according to the invention.
Figure 4:
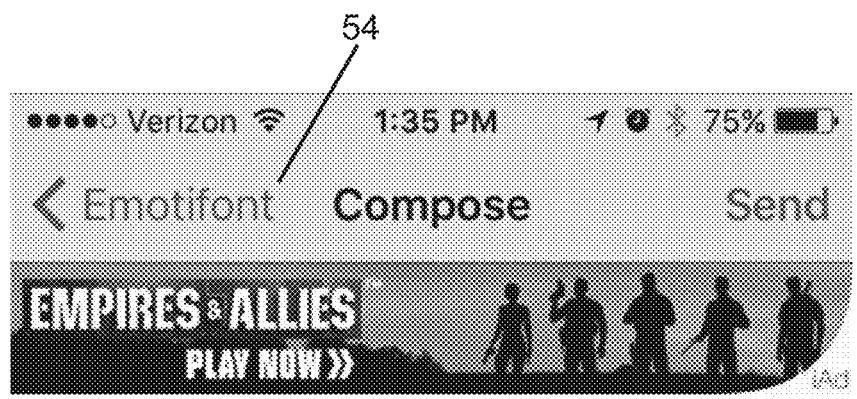
Figure 4:
Figure 4:
Figure 4:
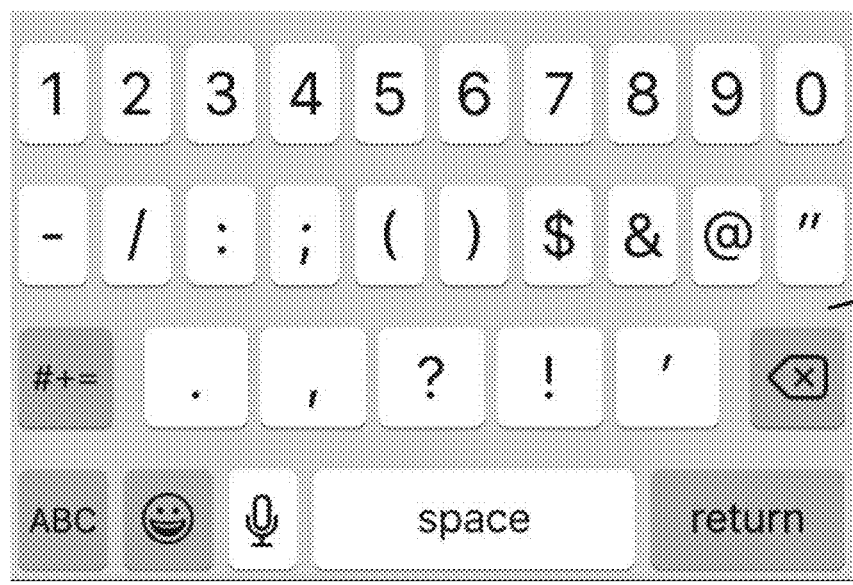
Figure 5:
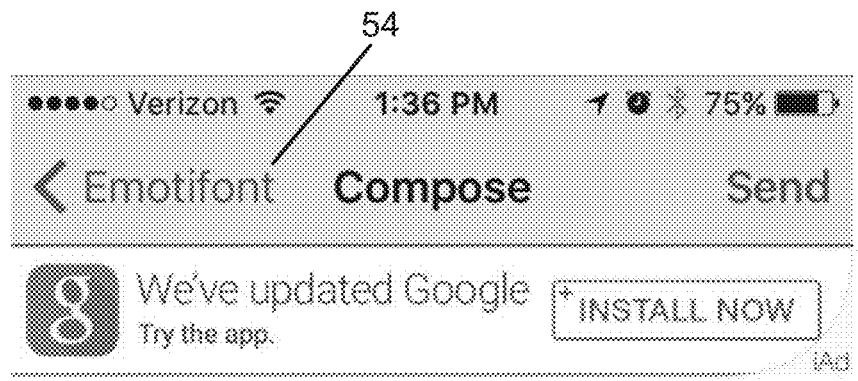
Figure 5:
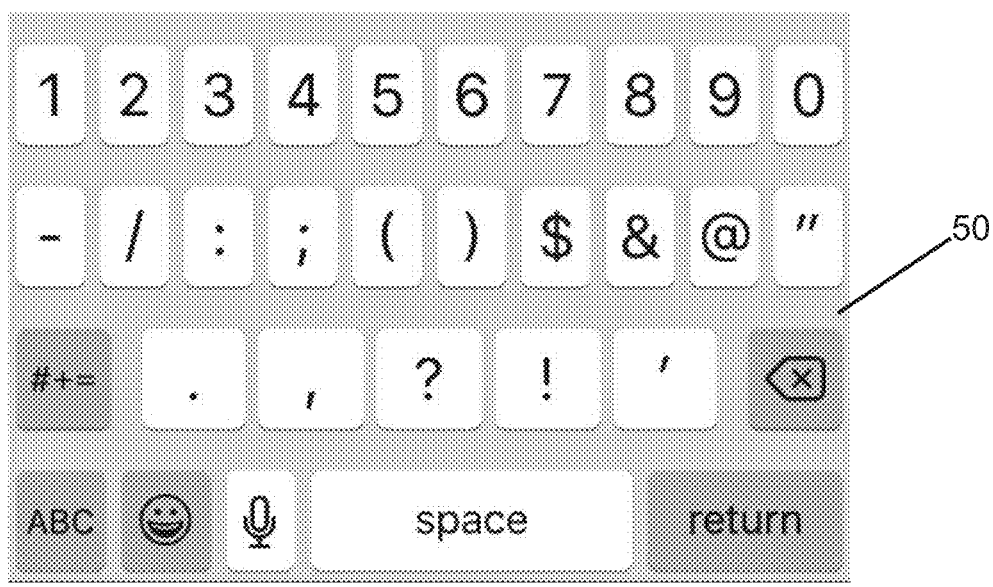
Figure 6:
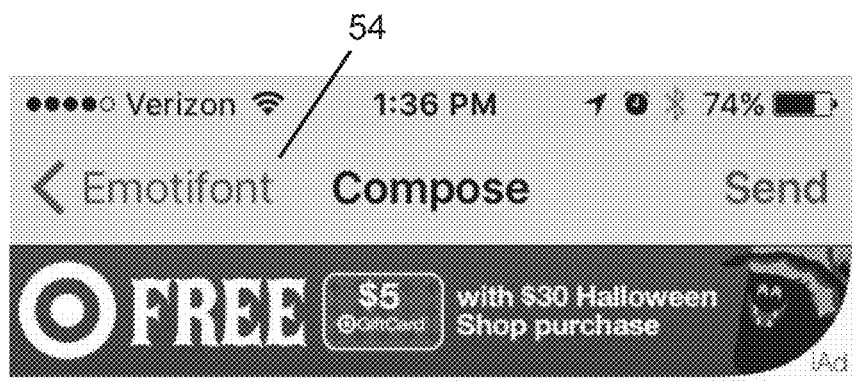
Figure 6:

Once the user selects one of the fanciful fonts, the keyboard 50 and the preview screen 52 appear. The user types a message using the standard keyboard 50, and the characters appear in the fanciful form in the preview screen 52. When the user is done with the message, the user clicks the send button 60 (FIG. 3). The message can be sent as any known communication form such as: a text message, an email, Notes, Twitter, Facebook, iCloud photo sharing, Voxer, Outlook, Linkedin, Messenger, Whatsapp, Snapchat, Instagram, Dropbox, Save the Image, etc.

An additional feature of the App is the ability to create a personal fanciful font that can be saved for use.

The App further includes a store feature, wherein the user can personalize and purchase merchandise having a message created by the user using the App. The App allows a user to tag or identify specific messages which have been created using the app, which are then saved or segregated within the App. Within the store feature of the App, the user may then access the tagged messages, and select one or more of the tagged messages to be applied to a particular piece of merchandise. For example, the user may select a first message to be applied to a shirt. The store feature of the App then renders a graphical representation of the selected message on the shirt, so that the user can preview an appearance of the shirt before purchasing. The user may customize features of the shirt, such as size, color, and message application method (e.g. embroidery, screen printing, dye-sublimation). The user then confirms and submits the order through the App. Other merchandise and merchandise features will be appreciated by those of ordinary skill in the art.

The App is further configured to track usage of the user, and to provide a feedback based on the usage. In a first embodiment, the usage is based on a quantity of messages sent by the user through the App. However, in alternate embodiment, a calculation of usage may also include measuring other forms of user interaction with the App, such a quantity of messages received, a quantity and cost of fanciful fonts purchased from within the app, and a quantify and cost of merchandise purchased from the store feature, for example.

The feedback provided may include a passive feedback, such as displaying a comparison of usages for users of the App. For example, the App may display a leaderboard showing the users having the highest usages. In other embodiments, the feedback may be an active feedback, which provides a user with a tangible reward. For example, the reward may be in the form of loyalty points, which can be applied towards the purchase of additional fanciful fonts or merchandise.

One of the features of the present invention is the creation of branded fanciful font sets. For example, as shown in FIG. 7, the user can scroll through a list of fanciful fonts and select the branded fanciful font set identified as "Officially licensed by The Ohio State University" with the "Pick Emotifont" softkey 58. A "brand" is a name, symbol or design that identifies and differentiates a product from other products. An effective brand strategy gives the brand owner a major edge in increasingly competitive markets. In the case of The Ohio State University, the brand includes design features such as the use of the school colors: scarlet and gray. These predetermined colors are important design features that are subject to Brand Guidelines published on the website of The Ohio State University. Other important design features of the brand are the symbols: Buckeye leaves and Buckeye nut. The Ohio State University Brand Guidelines also include official university fonts.

Figure 22:
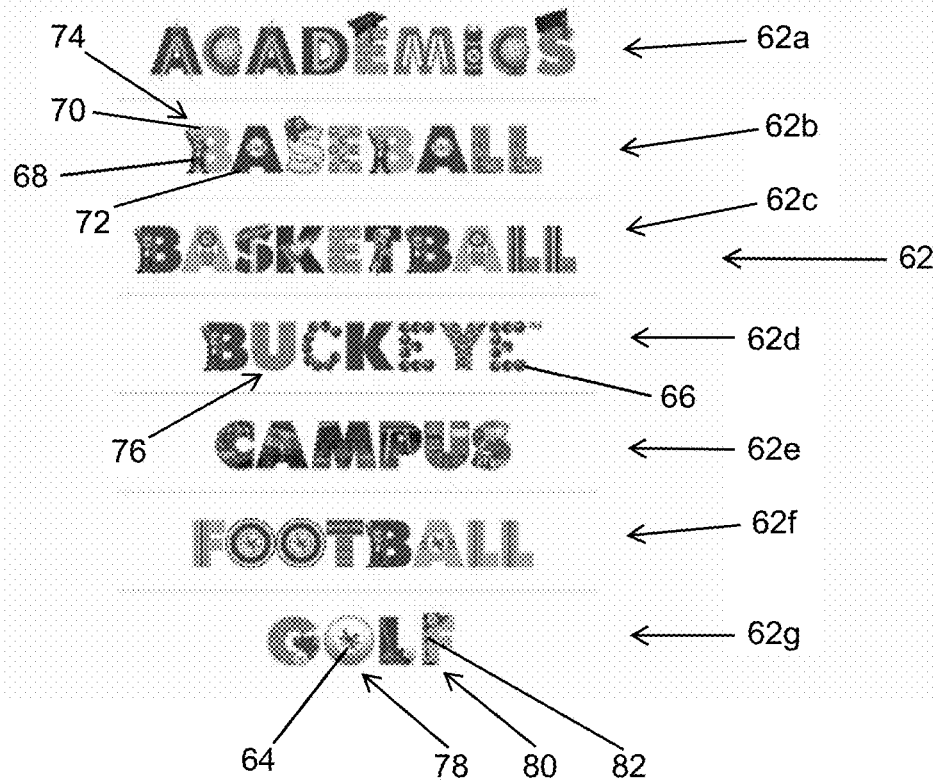
FIG. 22 is a screen shot of branded fanciful fonts available for selection according to the invention.

FIG. 22 shows several branded fanciful font sets 62 according to the invention based upon the brand of The Ohio State University. These font sets 62 appear on the display 22 when the branded fanciful font set identified as "Officially licensed by The Ohio State University" shown in FIG. 7 is selected. All of the font sets 62 include the school colors design feature and most of the font sets include one or more of the Buckeye leaves 64, the Buckeye nut 66 and the Brutus Buckeye mascot 68 design features. The Buckeye leaf design feature 64 and the Buckeye nut design feature 66 are symbols that represent the school nickname "Buckeye" that has been the official Ohio State nickname since 1950. The font sets are in block letter format of a selected one of the specified official university fonts.

Each of the branded fanciful font sets 62 represents a different theme such as academics, sports and campus. The themed branded fanciful font sets 62 include an ACADEMICS theme font set 62a, a BASEBALL theme font set 62b, a BASKETBALL theme font set 62c, a BUCKEYE nickname theme font set 62d, a CAMPUS theme font set 62e, a FOOTBALL theme font set 62f and a GOLF theme font set 62g. As an example of the use of the school colors, a shade of the fanciful letter "B" 70 in the BASEBALL theme font set 62b can represent one school color, such as gray, and a shade of the fanciful letter "A" 72 can represent another school color, such as red. FIG. 22 shows a selected official university font set having a block letter format used to create the branded fanciful font sets 62.

The ACADEMICS theme font set 62a includes non-licensed design features related to university academics such as a terrestrial globe combined with a portion of the letter "C", a mortarboard cap combined with portions of the letters "E" and "S", and a book representing the letter "I". In the BASEBALL theme font set 62b, a first fanciful text character 74 combines the mascot 68 and only a portion of a first text character "B" of the selected font set. The font set 62b also includes non-licensed design features related to the sport of baseball such as a baseball combined with a portion of the letter "A" and a baseball cap combined with a portion of the letter "S". The BASKETBALL theme font set includes non-licensed design features related to the sport of basketball such as a basketball player combined with a portion of the letter "T". In the BUCKEYE nickname theme font set 62d, a second fanciful text character 76 combines at least one of the school colors (gray) and a second text character "U" of the selected font set. In the CAMPUS theme font set 62e, the font characters have superposed images of the university campus. In the FOOTBALL theme font set 62f, several of the text characters include both of the school colors and the Buckeye leaf 64 is combined with the letters "O" and "A". In the GOLF theme font set 62g, a third fanciful text character 78 combines at least one of the school colors, a portion of a third text character "O" of the selected font set and a nickname symbol such as the Buckeye leaf 64. A fourth fanciful text character 80 of the font set 62g combines a non-licensed design feature sport symbol, such as the golf flagstick 82, together with one of the school colors (gray) and the text character "F". Also, the design features can be used to entirely form a fanciful text character such as the nine Buckeye nuts 66 that form the letters "C" and "E" in the branded fanciful font set 62d.

A method for generating branded fanciful fonts in text messages created with a communication device, according to the invention, comprises the steps of: licensing from a brand owner a brand for use with a font, the brand including at least one design feature identifying the brand; creating a branded fanciful font set incorporating the at least one design feature; and creating a font application that when executed by the communication device enables a user of the communication device to select the branded fanciful font set whereby when the user composes a text message with the communication device by inputting text characters using a keyboard displayed by the communication device in a display, the font application responds to the text characters by creating the text message incorporating the branded fanciful font set and the communication device displays the text message incorporating the branded fanciful font set in the display.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for generating branded fanciful fonts in text messages created with a communication device, the method comprising the steps of:
   obtaining a specified font set that is designated as licensed and is associated with a brand owner of a brand, wherein the specified font set includes text characters and separate brand design features that identify the brand, and wherein the brand owner is designated to a university and the brand design features include two school colors, a nickname symbol and a mascot;
   creating a plurality of branded fanciful font sets each having a plurality of fanciful text characters by combining the brand design features with more than one of the text characters of the specified font set;
   creating a font application that when executed by the communication device generates on a touchscreen display of the communication device a first screen showing a Pick Emotifont softkey and a list of fanciful font sets including a university image representing the plurality of branded fanciful font sets;
   wherein when a user of the communication device selects the university image with the softkey the font application responds to the selection by generating on the display a second screen showing a plurality of font images, each of the font images representing an associated one of the branded fanciful font sets;
   wherein when the user selects, by touching the display, one of the font images on the second screen the font application enables the user to compose a text message with the communication device by inputting text using a keyboard displayed by the communication device on the display, the font application responding to the inputted text by creating the text message incorporating the selected branded fanciful font set and the communication device displaying the text message incorporating the selected branded fanciful font set on the display.

2. The method according to claim 1 including:
wherein a first fanciful text character of the plurality of fanciful text characters combines the mascot with a portion of a first text character of the specified font set;
wherein a second fanciful text character of the plurality of fanciful text characters combines at least one of the school colors with a second text character of the specified font set; and
wherein a third fanciful text character of the plurality of fanciful text characters combines the nickname symbol with a portion of a third text character of the specified font set.

3. The method according to claim 2 wherein at least two of the branded fanciful font sets include the second fanciful text character, the first fanciful text character being included only in a first of the at least two branded fanciful font sets and the third fanciful text character being included only in a second of the at least two branded fanciful font sets.

4. The method according to claim 2 wherein each of the branded fanciful font sets includes a fourth fanciful text character of the plurality of fanciful text characters that combines a portion of a fourth text character of the specified font set with a non-licensed design feature.

5. The method according to claim 4 wherein each of the branded fanciful font sets incorporates a different theme representing one of academics, baseball, basketball, the university nickname, campus of the university, football and golf and the non-licensed design feature is related to the theme.

6. The method according to claim 5 wherein the non-licensed design feature for the campus theme is a superposed image of the campus of the university.

7. The method according to claim 2 wherein at least one of the branded fanciful font sets includes a fourth fanciful text character of the plurality of fanciful text characters that is formed entirely from a plurality of the nickname symbol.

8. The method according to claim 1 wherein the university image generated by the font application identifies the plurality of branded fanciful font sets by including "Officially licensed by" text followed by a name of the university.

\* \* \* \* \*